(12) United States Patent
Dawley

(10) Patent No.: US 10,266,458 B2
(45) Date of Patent: Apr. 23, 2019

(54) PROPELLANT WITH EXTENDED STORAGE LIFE

(71) Applicant: Aerojet Rocketdyne, Inc., Sacramento, CA (US)

(72) Inventor: Scott Dawley, Culpeper, VA (US)

(73) Assignee: AEROJET ROCKETDYNE, INC, Rancho Cordova, CA (US)

( * ) Notice: Subject to any disclaimer, the term of this patent is extended or adjusted under 35 U.S.C. 154(b) by 781 days.

(21) Appl. No.: 14/681,138

(22) Filed: Apr. 8, 2015

(65) Prior Publication Data

US 2015/0291483 A1    Oct. 15, 2015

Related U.S. Application Data

(60) Provisional application No. 61/977,393, filed on Apr. 9, 2014.

(51) Int. Cl.
| | |
|---|---|
| C06B 45/10 | (2006.01) |
| F02K 9/08 | (2006.01) |
| C06B 45/04 | (2006.01) |
| C06B 45/06 | (2006.01) |
| D03D 23/00 | (2006.01) |
| D03D 43/00 | (2006.01) |

(52) U.S. Cl.
CPC ............. C06B 45/10 (2013.01); F02K 9/08 (2013.01)

(58) Field of Classification Search
USPC ............. 149/17, 18, 19.6, 19.9, 109.4
See application file for complete search history.

(56) References Cited

U.S. PATENT DOCUMENTS

| | | | | |
|---|---|---|---|---|
| 3,753,348 | A * | 8/1973 | Burnside | C06B 23/007 149/18 |
| 4,099,376 | A * | 7/1978 | Japs | C06B 23/007 149/19.4 |
| 5,696,296 | A * | 12/1997 | Naumann | C07F 9/5027 568/16 |
| 6,226,979 | B1 * | 5/2001 | Pate | F02K 9/12 102/291 |
| 6,783,613 | B1 * | 8/2004 | Gill | C06B 45/10 149/19.1 |
| 8,049,356 | B2 * | 11/2011 | Chervin | F03B 13/20 290/53 |

(Continued)

FOREIGN PATENT DOCUMENTS

CN        102604071 A  *  7/2012

OTHER PUBLICATIONS

Iwama, A., Kazuo, H., Takahashi, T. (1996). Hydrogenated hydroxy-terminated polyisoprene as a fuel binder for composite solid propellants. Propellants, Explosives, Pyrotechnics 21, 43-50 (1996).

*Primary Examiner* — James E McDonough
(74) *Attorney, Agent, or Firm* — Joel G Landau

(57) ABSTRACT

A propellant includes a binder system that has a polybutadiene component, a polytetrahydrofuran component, and an anti-oxidant component. In an example, the propellant includes a solid oxidizer, a solid fuel, and a binder system that holds the solid oxidizer and the solid fuel together. The binder system includes a polybutadiene component, a hydrocarbon diluent component of a higher level of saturation than the polybutadiene component, and an anti-oxidant component.

32 Claims, 1 Drawing Sheet

(56) References Cited

U.S. PATENT DOCUMENTS

| | | | | |
|---|---|---|---|---|
| 8,465,607 B1 * | 6/2013 | Kelley | ............ | F02K 9/18 |
| | | | | 149/87 |
| 8,587,945 B1 * | 11/2013 | Hartmann | ............ | H05K 7/20454 |
| | | | | 361/679.53 |
| 2004/0226638 A1 * | 11/2004 | Posson | ............ | C06B 21/0025 |
| | | | | 149/45 |
| 2011/0100015 A1 * | 5/2011 | Alagappan | ............ | F02C 7/22 |
| | | | | 60/772 |
| 2013/0289172 A1 * | 10/2013 | Avramidis | ............ | C08L 95/00 |
| | | | | 524/60 |
| 2014/0326370 A1 * | 11/2014 | Vogelsanger | ............ | C06B 21/0083 |
| | | | | 149/17 |

* cited by examiner

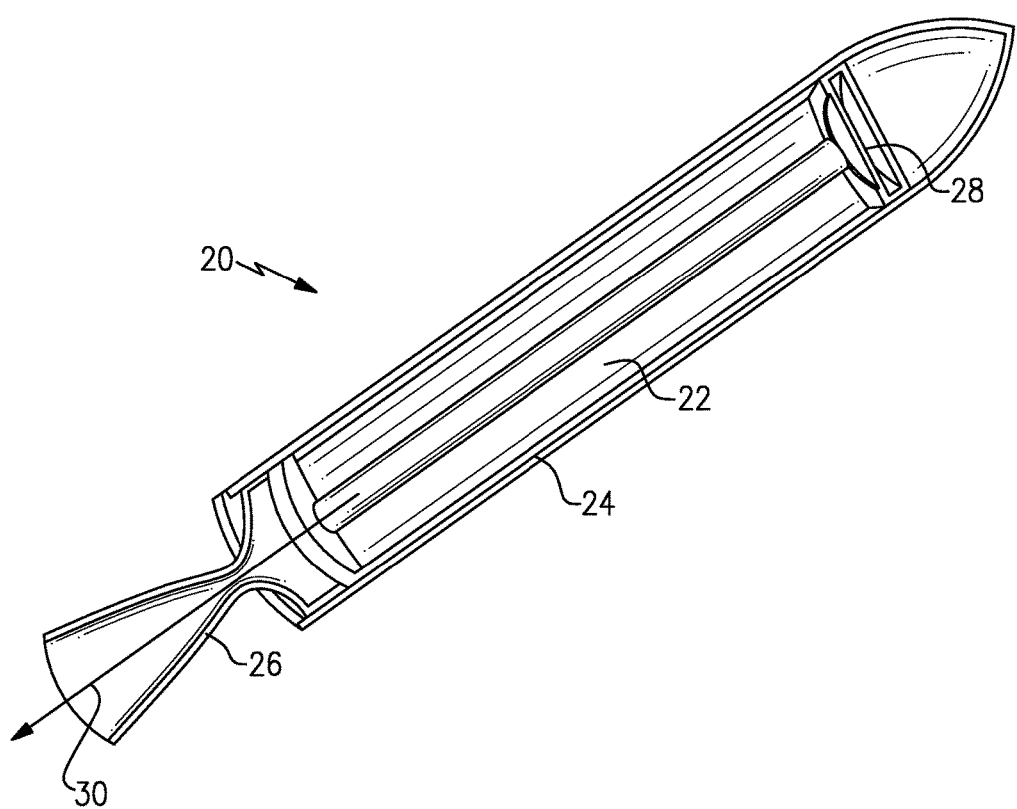

PROPELLANT WITH EXTENDED STORAGE LIFE

CROSS-REFERENCE TO RELATED APPLICATIONS

The present disclosure claims priority to U.S. Provisional Patent Application No. 61/977,393, filed Apr. 9, 2014.

BACKGROUND

This disclosure relates to rocket motors and, more particularly, to solid propellants for such motors. Solid propellant can include an oxidizer and fuel that are mixed with a polymeric binder that enables the propellant to be formed into a desired shape for incorporation into the motor. One example binder is polybutadiene that is derived from hydroxyl-terminated polybutadiene.

SUMMARY

A propellant according to an example of the present disclosure includes a binder system that has a polybutadiene component, a polytetrahydrofuran component (either hydroxyl-terminated or non hydroxy-terminated), and an anti-oxidant component.

In a further embodiment of any of the foregoing embodiments, the anti-oxidant includes triphenyl phosphine.

In a further embodiment of any of the foregoing embodiments, the anti-oxidant includes a thioester.

In a further embodiment of any of the foregoing embodiments, the anti-oxidant includes a Tris-(2,4-di-t-butylphenyl) phosphite.

In a further embodiment of any of the foregoing embodiments, the anti-oxidant includes a 2,2,4-trimethyl-1,2-dihydroquinoline.

In a further embodiment of any of the foregoing embodiments, the anti-oxidant is a phosphite.

In a further embodiment of any of the foregoing embodiments, the anti-oxidant is a phosphane.

In a further embodiment of any of the foregoing embodiments, the anti-oxidant is a hindered phenol.

In a further embodiment of any of the foregoing embodiments, the anti-oxidant is a diphenyl amine.

In a further embodiment of any of the foregoing embodiments, the anti-oxidant is a benzimadazole.

In a further embodiment of any of the foregoing embodiments, the polytetrahydrofuran component has a 1000 molecular weight.

In a further embodiment of any of the foregoing embodiments, the polybutadiene component is hydroxyl-terminating.

In a further embodiment of any of the foregoing embodiments, the anti-oxidant is a phosphite, the polytetrahydrofuran component has a molecular weight between approximately 650 and 1500, and the polybutadiene component is hydroxyl-terminating.

In a further embodiment of any of the foregoing embodiments, the polytetrahydrofuran component is a polytetramethylether glycol.

In a further embodiment of any of the foregoing embodiments, propellant binder has approximately 25%-100% concentration of the polytetrahydrofuran component as the pre-polymer.

In a further embodiment of any of the foregoing embodiments, the polytetrahydrofuran component has a molecular weight of 250-3000 grams/mol.

A propellant according to an example of the present disclosure includes a solid oxidizer, a solid fuel, and a binder system holding the solid oxidizer and the solid fuel together. The binder system includes a polybutadiene component, a hydrocarbon diluent component of a higher level of saturation than the polybutadiene component, and an anti-oxidant component.

In a further embodiment of any of the foregoing embodiments, the hydrocarbon diluent component (either hydroxyl-terminated or non hydroxy-terminated) is selected from the group consisting of polytetrahydrofuran, hydrogenated-polybutadiene, hydrogenated-polyisoprene, polypropylene, saturated or near-saturated hydrocarbon resin and combinations thereof.

In a further embodiment of any of the foregoing embodiments, the hydrocarbon diluent component includes polytetrahydrofuran.

In a further embodiment of any of the foregoing embodiments, the hydrocarbon diluent component includes hydrogenated-polybutadiene.

In a further embodiment of any of the foregoing embodiments, the hydrocarbon diluent component includes hydrogenated-polyisoprene.

In a further embodiment of any of the foregoing embodiments, the hydrocarbon diluent component includes polypropylene.

In a further embodiment of any of the foregoing embodiments, the hydrocarbon diluent component includes a saturated hydrocarbon resin.

In a further embodiment of any of the foregoing embodiments, the propellant includes, by weight, 5-20% of the binder system.

In a further embodiment of any of the foregoing embodiments, the binder system includes, by weight, 1% of the anti-oxidant component.

In a further embodiment of any of the foregoing embodiments, the binder system includes a ratio, by weight, of the amount of polybutadiene component to the amount of hydrocarbon diluent component that is from 0/100 to 75/25.

In a further embodiment of any of the foregoing embodiments, the hydrocarbon diluent component includes a saturated linear hydrocarbon.

In a further embodiment of any of the foregoing embodiments, the hydrocarbon diluent component includes a saturated branched hydrocarbon.

In a further embodiment of any of the foregoing embodiments, the hydrocarbon diluent component includes an oxy-hydrocarbon.

In a further embodiment of any of the foregoing embodiments, the hydrocarbon diluent component has a molecular weight of 250-3000 grams/mol.

In a further embodiment of any of the foregoing embodiments, the hydrocarbon diluent component has a diluent molecular weight and the polybutadiene component has a polybutadiene component has a polybutadiene molecular weight, and the diluent molecular weight is within +/−100% of the polybutadiene molecular weight.

A rocket motor according to an example of the present disclosure includes a chamber and a nozzle, a propellant in the chamber and operable to generate thrust from the nozzle. The propellant includes a solid oxidizer, a solid fuel, a binder system holding the solid oxidizer and the solid fuel together. The binder system includes a polybutadiene component, a hydrocarbon diluent component of a higher level of saturation than the polybutadiene component, and an anti-oxidant.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example rocket motor that includes a solid propellant with composition for mitigating the effects of aging.

DETAILED DESCRIPTION

FIG. 1 illustrates an example rocket motor 20 that includes a solid propellant 22 that is operable for ignition to generate thrust. In general, solid propellants can include a mixture of an oxidizer, a fuel, and a polymer-based binder that holds the oxidizer and fuel together and enables the propellant to be formed into a desired geometry for employment in a rocket motor. Polymeric binders may be based on polybutadiene, such as unsaturated hydroxyl-terminated polybutadiene. The properties of the unsaturated polybutadiene can change over time, i.e., the polybutadiene "ages," due to spontaneous oxidation reactions that cause cross-linking at the unsaturated carbon-carbon double bond sites of the polybutadiene, for example. As a result of this aging phenomenon, the binder may harden such that the modulus increases to a point where the rocket motor is no longer useful. As will be described, the propellant 22 disclosed herein has a composition for mitigating the effects of aging, thus potentially extending the storage life of the propellant 22 and/or motor 20.

The rocket motor 20 is a non-limiting example for the purpose of illustrating an exemplary implementation of the propellant 22. Alternatively, the propellant may be used in other types of motors or propulsion systems and in various types of vehicles, such as but not limited to, spacecraft, missiles, and the like.

In this example, the motor 20 includes a chamber 24, such as a housing, casing, or shell, and a nozzle 26. The propellant 22 is situated within the chamber 24. The chamber serves as a reaction vessel for the propellant 22. An ignitor 28 is operable to cause ignition of the propellant 22 to generate thrust from the nozzle 26, as generally represented at 30.

The propellant 22 includes a solid oxidizer, a solid fuel, a binder system that holds the solid oxidizer and the solid fuel together and optionally performance additives. The propellant 22 may be a mixture of the solid oxidizer, the solid fuel, and the binder system including, for example, powders or particulates of the solid oxidizer and the solid fuel. However, the propellant 22 is not limited to such structures and may alternatively or additionally include layered structures or other controlled structures of the solid oxidizer and the solid fuel with the binder system. An example oxidizer can include ammonium perchlorate, and an example fuel can include aluminum, although other oxidizers and/or fuels may be substituted or blended.

The binder system includes a hydroxyl-terminated polybutadiene component, a hydrocarbon diluent component (either hydroxyl-terminated or non hydroxyl-terminated) of a higher level of saturation than the polybutadiene component, and an anti-oxidant component. The polybutadiene component includes unsaturated polybutadiene, such as that based upon hydroxyl-terminated polybutadiene. The unsaturated sites at carbon-carbon double bonds in the backbone of the unsaturated polybutadiene are subject to aging oxidation reactions that can cause cross-linking and, in turn, hardening. The addition of the hydrocarbon diluent component of a higher level of saturation dilutes and reduces the overall concentration of unsaturated sites in the propellant 22 and thus reduces the potential for aging reactions at such sites. Moreover, the hydrocarbon diluent component can be selected for compatibility with the unsaturated polybutadiene such that the diluent is soluble in the unsaturated polybutadiene for enhanced dispersion.

The hydrocarbon diluent component can be selected from polytetrahydrofuran, hydrogenated-polybutadiene, hydrogentated-polyisoprene, polypropylene, saturated or near-saturated hydrocarbon resin, or combinations thereof. In further examples, the diluent component has a molecular weight of 250-3000 grams/mol, such as 650 grams/mol, 1000 grams/mol, 2000 grams/mol, or 2500 grams/mol, and in further examples can be selected to be within +/−100% of the molecular weight of the unsaturated polybutadiene to facilitate compatibility.

As an example, the polytetrahydrofuran is a polytetramethyl ether glycol and has a composition as represented below as Structure I. The polytetrahydrofuran is also a non-limiting example of a saturated linear oxy-hydrocarbon.

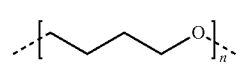

Structure I

As one example, there is a 25%-100% concentration of the polytetrahydrofuran component as the pre-polymer.

As an example, a hydrogenated-polybutadiene (of the diluent) has a composition as represented below as Structure II. The polybutadiene (of the diluent) is also a non-limiting example of a saturated branched oxy-hydrocarbon.

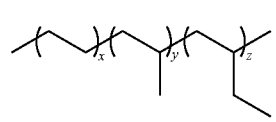

Structure II

As an example, a hydrogenated polyisoprene has a composition as represented below as Structure III.

$$HO\text{---}(CH_2\text{---}\underset{\underset{CH_3}{|}}{CH}\text{---}CH_2\text{---}CH_2)_n\text{---}OH$$

Structure III

As an example, another hydrogenated has a composition as represented below as Structure IV. This series is also another non-limiting example of a saturated branched oxy-hydrocarbon.

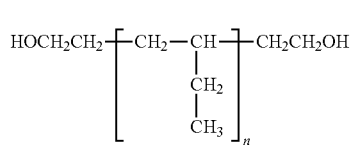

Structure IV

In additional examples, the binder system includes a ratio, by weight, of the amount of unsaturated polybutadiene component to the amount of hydrocarbon diluent component that is from 25 to 100%. The ratio provides an effective dilution of the unsaturated polybutadiene component to mitigate aging and maintain or enhance/increase other properties, such as strain capacity.

The anti-oxidant component further mitigates aging by reactively consuming or intercepting oxygen such that the oxygen is prevented from instead reacting at the unsaturated sites of the unsaturated polybutadiene. In one example, the anti-oxidant includes triphenyl phosphine. In another example, the anti-oxidant includes a thioester, or a blend of triphenyl phosphine and a thioester. In another example, the anti-oxidant includes a Tris-(2,4-di-t-butylphenyl) phosphite. In another example, the anti-oxidant includes a 2,2,4-tirmehtyl-1,2-dihydroquinoline. In another example, the anti-oxidant is a phosphite. In another example, the anti-oxidant is a phosphane. In another example, the anti-oxidant is a hindered phenol. In another example, the anti-oxidant is a diphenyl amine. In another example, the anti-oxidant is a benzimadazole. In further examples, the binder system includes, by weight, 1% of the anti-oxidant component.

In additional examples, the propellant 22 includes, by weight, 5-20% of the binder system, with the remainder being the oxidizer, the fuel, and any additives. The additives, if used, can include stabilizers, burn rate modifiers, and the like.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A propellant comprising a binder system that has a polybutadiene component, a polytetrahydrofuran component which is either hydroxyl-terminated or non hydroxy-terminated, and an anti-oxidant component, the polytetrahydrofuran component having a polytetrahydrofuran molecular weight and the polybutadiene component have a polybutadiene molecular weight, and the polytetrahydrofuran molecular weight is within +/−100% of the polybutadiene molecular weight.

2. The propellant as recited in claim 1, wherein the anti-oxidant includes triphenyl phosphine.

3. The propellant as recited in claim 1, wherein the anti-oxidant includes a thioester.

4. The propellant as recited in claim 1, wherein the anti-oxidant includes a Tris-(2,4-di-t-butylphenyl) phosphite.

5. The propellant as recited in claim 1, wherein the anti-oxidant includes a 2,2,4-tirmehtyl-1,2-dihydroquinoline.

6. The propellant as recited in claim 1, wherein the anti-oxidant is a phosphite.

7. The propellant as recited in claim 1, wherein the anti-oxidant is a phosphane.

8. The propellant as recited in claim 1, wherein the anti-oxidant is a hindered phenol.

9. The propellant as recited in claim 1, wherein the anti-oxidant is a diphenyl amine.

10. The propellant as recited in claim 1, wherein the anti-oxidant is a benzimadazole.

11. The propellant as recited in claim 1, wherein the polybutadiene component is hydroxyl-terminating.

12. The propellant of claim 1, wherein the anti-oxidant is a phosphite, the polytetrahydrofuran molecular weight is between approximately 650 and 1500, and the polybutadiene component is hydroxyl-terminating.

13. The propellant of claim 1, wherein the polytetrahydrofuran component is a polytetramethylether glycol.

14. The propellant of claim 1, wherein propellant binder has approximately 25%-100% concentration of the polytetrahydrofuran component as the pre-polymer.

15. The propellant as recited in claim 1, wherein the polytetrahydrofuran molecular weight is 250-3000 grams/mol.

16. A propellant comprising:
    a solid oxidizer;
    a solid fuel; and
    a binder system holding the solid oxidizer and the solid fuel together, the binder system including a polybutadiene component, a hydrocarbon diluent component of a higher level of saturation than the polybutadiene component, and an anti-oxidant component, the hydrocarbon diluent component having a diluent molecular weight and the polybutadiene component having a polybutadiene molecular weight, and the diluent molecular weight with within +/−100% of the polybutadiene molecular weight.

17. The propellant as recited in claim 16, wherein the hydrocarbon diluent component is either hydroxyl-terminated or non hydroxyl-terminated and is selected from the group consisting of polytetrahydrofuran, hydrogenated-polybutadiene, hydrogenated-polyisoprene, polypropylene, saturated or near-saturated hydrocarbon resin and combinations thereof.

18. The propellant as recited in claim 16, wherein the hydrocarbon diluent component includes polytetrahydrofuran.

19. The propellant as recited in claim 16, wherein the hydrocarbon diluent component includes hydrogenated-polybutadiene.

20. The propellant as recited in claim 16, wherein the hydrocarbon diluent component includes hydrogenated-polyisoprene.

21. The propellant as recited in claim 16, wherein the hydrocarbon diluent component includes polypropylene.

22. The propellant as recited in claim 16, wherein the hydrocarbon diluent component includes a saturated hydrocarbon resin.

23. The propellant as recited in claim 16, wherein the propellant includes, by weight, 5-20% of the binder system.

24. The propellant as recited in claim 16, wherein the binder system includes, by weight, 1% of the anti-oxidant component.

25. The propellant as recited in claim 16, wherein the binder system includes a ratio, by weight, of the amount of polybutadiene component to the amount of hydrocarbon diluent component that is from 0/100 to 75/25.

26. The propellant as recited in claim 16, wherein the hydrocarbon diluent component includes a saturated linear hydrocarbon.

27. The propellant as recited in claim 16, wherein the hydrocarbon diluent component includes a saturated branched hydrocarbon.

28. The propellant as recited in claim 16, wherein the hydrocarbon diluent component includes an oxy-hydrocarbon.

29. The propellant as recited in claim 16, wherein the diluent molecular weight is 250-3000 grams/mol.

30. A rocket motor comprising:
a chamber and a nozzle;
a propellant in the chamber and operable to generate thrust from the nozzle, the propellant including,
a solid oxidizer;
a solid fuel; and
a binder system holding the solid oxidizer and the solid fuel together, the binder system including a polybutadiene component, a hydrocarbon diluent component of a higher level of saturation than the polybutadiene component, and an anti-oxidant, the hydrocarbon diluent component having a diluent molecular weight and the polybutadiene component having a polybutadiene molecular weight, and the diluent molecular weight is within +/−100% of the polybutadiene molecular weight.

31. The propellant as recited in claim 1, wherein the binder system has a ratio, by weight, of the amount of unsaturated polybutadiene component to the amount of polytetrahydrofuran component that is from 25 to 100%.

32. The propellant as recited in claim 16, wherein the binder system has a ratio, by weight, of the amount of unsaturated polybutadiene component to the amount of hydrocarbon diluent component that is from 25 to 100%.

* * * * *